United States Patent
Wu

(10) Patent No.: US 9,237,445 B1
(45) Date of Patent: Jan. 12, 2016

(54) HETEROGENEOUS NETWORK CONTROL SYSTEM

(71) Applicant: Lai-Fu Wu, New Taipei (TW)

(72) Inventor: Lai-Fu Wu, New Taipei (TW)

( * ) Notice: Subject to any disclaimer, the term of this patent is extended or adjusted under 35 U.S.C. 154(b) by 0 days.

(21) Appl. No.: 14/552,495

(22) Filed: Nov. 25, 2014

(51) Int. Cl.
| | |
|---|---|
| *H04B 7/26* | (2006.01) |
| *H04W 88/04* | (2009.01) |
| *H04W 12/06* | (2009.01) |
| *H04W 16/26* | (2009.01) |
| *H04W 88/06* | (2009.01) |

(52) U.S. Cl.
CPC .............. *H04W 12/06* (2013.01); *H04W 16/26* (2013.01); *H04W 88/06* (2013.01)

(58) Field of Classification Search
CPC .............................. H04B 7/2606; H04W 88/04
See application file for complete search history.

(56) References Cited

U.S. PATENT DOCUMENTS

| | | | | |
|---|---|---|---|---|
| 6,404,775 B1* | 6/2002 | Leslie | ................ | H04B 7/15528 370/315 |
| 2002/0001295 A1* | 1/2002 | Park | .................... | H04L 12/2856 370/338 |
| 2010/0046418 A1* | 2/2010 | Horn | ..................... | H04W 40/22 370/315 |
| 2010/0312930 A1* | 12/2010 | Yamagata | ........... | G06F 13/4045 710/67 |
| 2011/0235625 A1* | 9/2011 | Lee | ..................... | H04L 65/1059 370/338 |
| 2013/0024901 A1* | 1/2013 | Sharif-Ahmadi | . | G06F 17/30017 725/114 |
| 2015/0094065 A1* | 4/2015 | Su | ......................... | H04W 36/30 455/436 |

* cited by examiner

*Primary Examiner* — Christopher M Brandt
(74) *Attorney, Agent, or Firm* — Leong C. Lei

(57) ABSTRACT

A heterogeneous network control system uses an application platform to connect a signal processor through a first signal telecommunication, and connect the signal processor to a signal converter through a second signal telecommunication, and connect the signal converter to a terminal through a third signal telecommunication. When signals are transmitted from the application platform to the terminal via a signal transmission path, the first signal is converted into a second signal by the signal processor, and the second signal is converted into a third signal by the signal converter. When signals are transmitted from the terminal to the application platform via the signal transmission path, the signal is converted in an opposite way. The first signal is a 3G, 4G, WiFi, powerline or Bluetooth signal, and the second signal is a WiFi, Bluetooth, Zigbee, powerline, EnOcean or Zwave signal. The system provides a communication mode for a heterogeneous network.

6 Claims, 5 Drawing Sheets

HETEROGENEOUS NETWORK CONTROL SYSTEM

BACKGROUND OF THE INVENTION

1. Field of the Invention

The present invention relates to a network system, and more particularly to a heterogeneous network system including a master base station, a relay station and a terminal capable of transmitting and receiving signals of different communication protocols.

2. Description of the Related Art

To satisfy the requirement for different network bandwidths and applications, various wireless communication technologies with different specifications are provided and applied in our daily products such as 3G and 4G products applied in a mobile communication system. Users may logon a network instantly through the connection of a mobile phone and a base station, and thus improving the convenience of use of the mobile phone significantly. In near-field wireless network system such as WiFi, Bluetooth, Zigbee, Zwave, RFID, and EnOcean systems applied for different purposes. The WiFi system can create a specific area network and encrypts such area network, so that only authorized uses may use the area network. The Bluetooth system is used extensively in many areas such as the data transmission of a wireless earphone, a wireless keyboard and mouse or between mobile phones. Since Bluetooth 4.0 comes with a better power saving mechanism, the Bluetooth system will be well developed in the future. The Zigbee, Zwave, and EnOcean systems feature low power consumption and low transmission rate, so that they are usually used for wireless sensing or detection and control such as household power supply control and medical treatment. The RFID system provides a relatively shorter transmission distance, so that the RFID system is generally applied in the areas of electronic fee collection system, identity recognition, logistics management, etc.

Since the wireless communication protocols with different specifications have different packet formats and operating frequencies, therefore the communication devices with different protocols cannot transmit/receive signals to/from each other, and the users' devices require the installation of different interface converting devices before they can communication with each other. In addition, the interface converting device can change the signal of a certain specific communication protocol only, but it cannot receive or transmit signals of different communication protocols.

To overcome the aforementioned drawback of the prior art, it is a main subject of the present invention to design and develop a heterogeneous communication network system that integrates signals of different communication protocols, so that devices of different communication protocols can communicate with each other. In addition, the system has a good encryption effect.

SUMMARY OF THE INVENTION

Therefore, it is a primary objective of the present invention to provide a heterogeneous network control system with the effect of integrating signals of different communication protocols, and the heterogeneous network control system forms a communication system for a heterogeneous network.

To achieve the aforementioned objective, the present invention provides a heterogeneous network control system, comprising a master base station and at least one relay station, and the master base station comprises a first communicator, a second communicator and a signal processor, and the relay station comprises a first relay communicator, a second relay communicator and a signal converter, and the first communicator is bi-directionally and telecommunicatively connected to an application platform through a first signal, and the first communicator is telecommunicatively connected to the signal processor, and the signal processor is telecommunicatively connected to the second communicator, and the second communicator is bi-directionally and telecommunicatively connected to the first relay communicator through a second signal, and the first relay communicator is telecommunicatively connected to the signal converter, and the signal converter is telecommunicatively connected to the second relay communicator, and the second relay communicator is bi-directionally and telecommunicatively connected to at least one terminal through a third signal, characterized in that when the heterogeneous network control system transmits signals from the application platform to the terminal via a signal transmission path, the first signal is converted into the second signal by the signal processor, and the second signal is converted into the third signal by the signal converter, and when the heterogeneous network control system transmits signals from the terminal to the application platform via the signal transmission path, the third signal is converted into the second signal by the signal converter, and the second signal is converted into the first signal by the signal processor to achieve a communication mode of a heterogeneous network, and the first signal is one selected from the group consisting of a 3G signal, a 4G signal, a WiFi signal, a powerline signal and a Bluetooth signal, and the second signal is one selected from the group consisting of a WiFi signal, a Bluetooth signal, a Zigbee signal, a powerline signal, an EnOcean signal and a Zwave signal.

Wherein, the third signal is one selected from the group consisting of a 3G signal, a 4G signal, a WiFi signal, a Zigbee signal, a Bluetooth signal, a RFID signal, a powerline signal, an EnOcean signal and a Zwave signal.

In another preferred embodiment, when the terminal is a controller, the third signal is one selected from the group consisting of a 3G signal, a 4G signal, a WiFi signal, a Zigbee signal, a Bluetooth signal, a RFID signal, a powerline signal, an EnOcean signal and a Zwave signal.

In addition, the controller includes a wireless identification code corresponsive to the relay station, and the wireless identification code is assigned through the relay station to generate an encrypted authentication code.

In another preferred embodiment, when the terminal is a mobile device, the third signal is one selected from the group consisting of a 3G signal, a 4G signal, a WiFi signal and a Bluetooth signal.

In another preferred embodiment, when the relay station comes with a plural quantity, the relay stations are telecommunicatively connected to each other through the second signal.

In the heterogeneous network control system of the present invention, the signal processor of the master base station and the signal converter of the relay station can convert the first signal, the second signal, and the third signal bi-directionally, and the application platform can transmit 3G, 4G, WiFi or Bluetooth signals to the terminal after the signals are converted and processed by the relay station. Therefore, the heterogeneous network control system of the present invention provides a communication method for different network protocols and achieves the effects of integrating heterogeneous signals effectively and simplifying the system.

DETAILED DESCRIPTION OF THE PREFERRED EMBODIMENTS

The aforementioned and other objectives, technical characteristics and advantages of the present invention will become apparent with the detailed description of preferred embodiments and the illustration of related drawings as follows.

Figure 1:
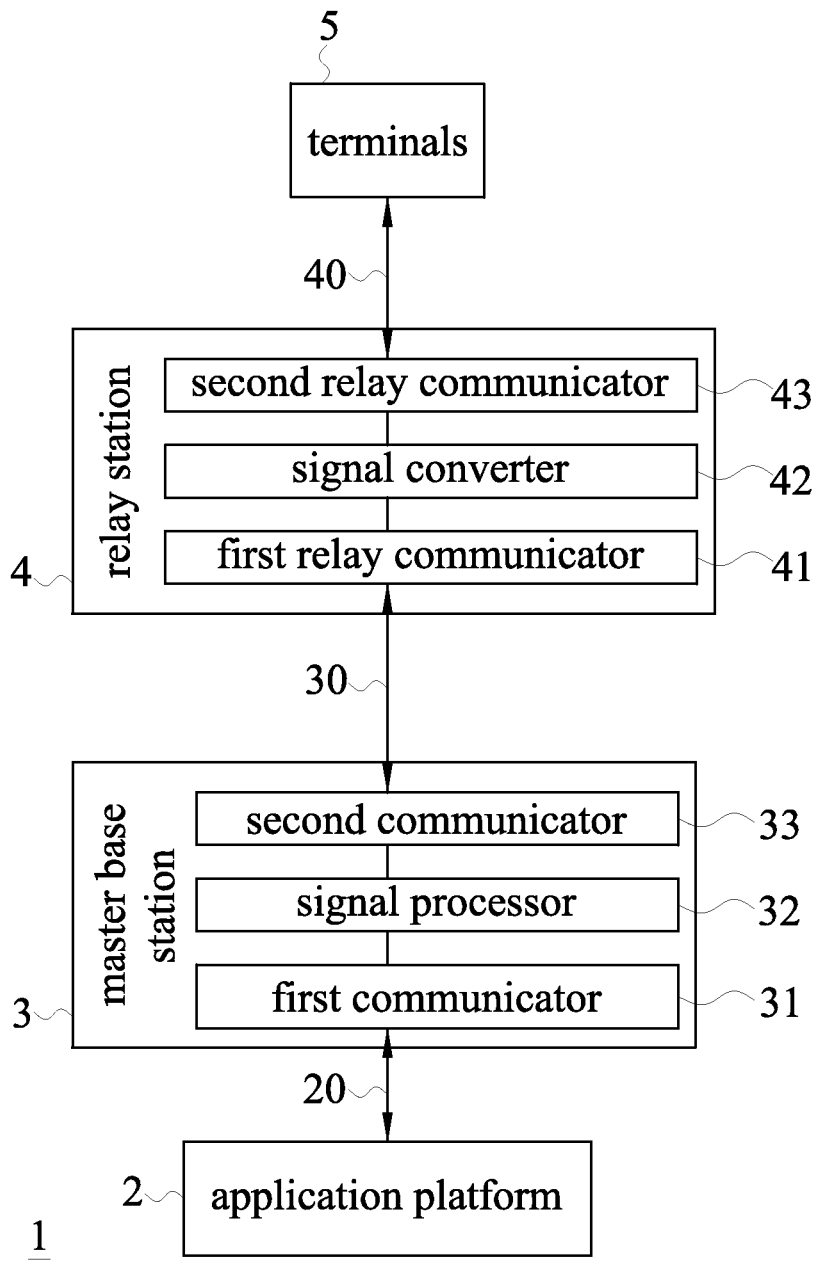
FIG. 1 is a schematic block diagram of a first preferred embodiment of the present invention.

With reference to FIG. 1 for a schematic block diagram of a heterogeneous network control system in accordance with the first preferred embodiment of the present invention, the heterogeneous network control system 1 comprises a master base station 3 and at least one relay station 4. The master base station 3 comprises a first communicator 31, a second communicator 33 and a signal processor 32, and the relay station 4 comprises a first relay communicator 41, a second relay communicator 43 and a signal converter 42. The first communicator 31 is bi-directionally and telecommunicatively connected to an application platform 2 through a first signal 20, and the first communicator 31 is telecommunicatively connected to the signal processor 32, and the signal processor 32 is telecommunicatively connected to the second communicator 33, and the second communicator 33 is bi-directionally and telecommunicatively connected to the first relay communicator 41 through a second signal 30, and the first relay communicator 41 is telecommunicatively connected to the signal converter 42, and the signal converter 42 is telecommunicatively connected to the second relay communicator 43, and the second relay communicator 43 is bi-directionally and telecommunicatively connected to at least one terminal 5 through a third signal 40. The present invention is characterized in that when the heterogeneous network control system 1 transmits signals from the application platform 2 to the terminal 5 via a signal transmission path, the first signal 20 is converted into the second signal 30 by the signal processor 32, and the second signal 30 is converted into the third signal 40 by the signal converter 42, and when the heterogeneous network control system 1 transmits signals from the terminal 5 to the application platform 2 via the signal transmission path, the third signal 40 is converted into the second signal 30 by the signal converter 42, and the second signal 30 is converted into the first signal 20 by the signal processor 32 to achieve a communication mode of a heterogeneous network, wherein the first signal 20 is a 3G signal, a 4G signal, a WiFi signal, a powerline signal or a Bluetooth signal, and the second signal 30 is a WiFi signal, a Bluetooth signal, a Zigbee signal, a powerline signal, an EnOcean signal or a Zwave signal.

Figure 2:
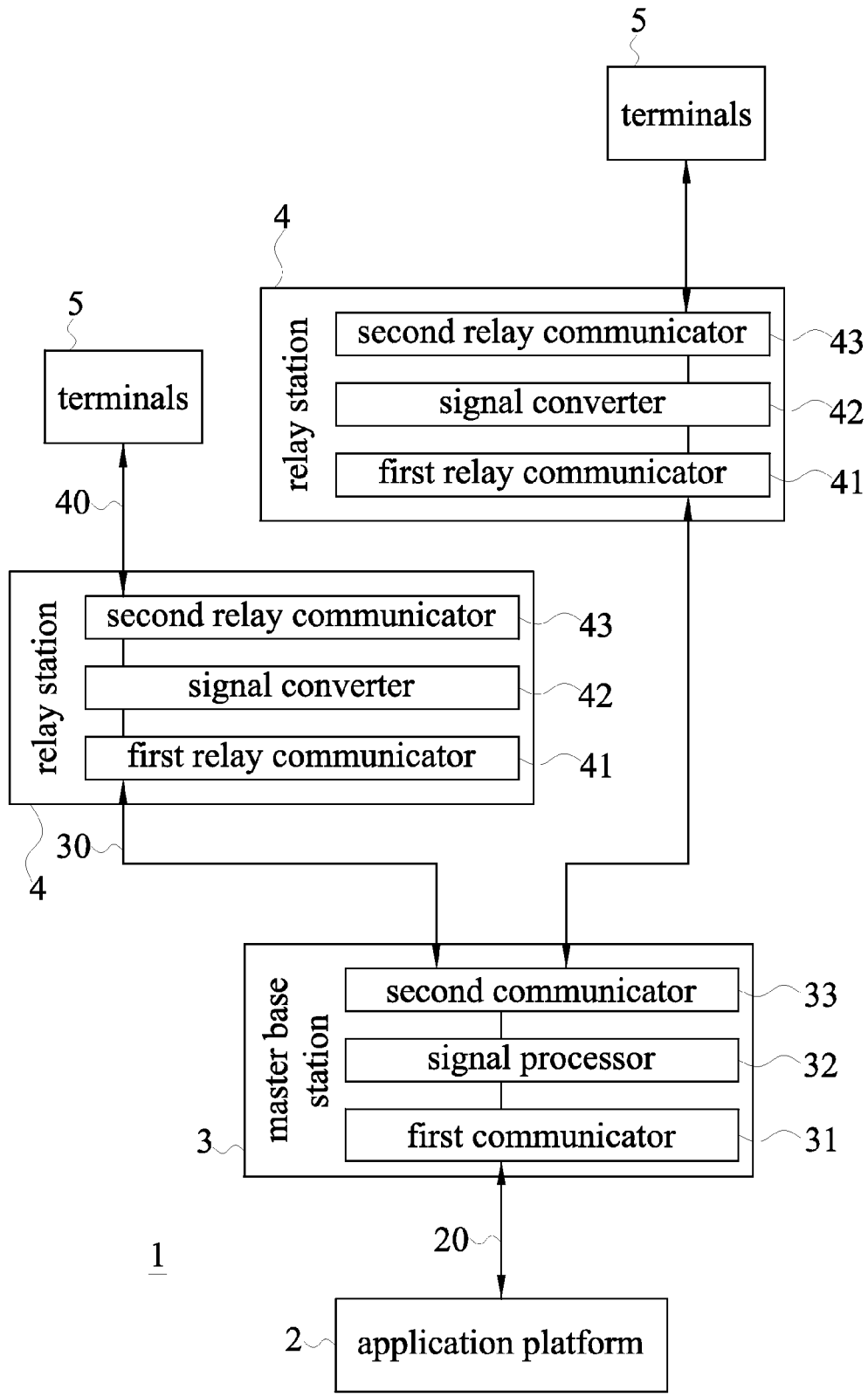
FIG. 2 is a schematic block diagram of another implementation mode of the first preferred embodiment of the present invention.

With reference to FIG. 2 for another implementation mode of the first preferred embodiment of the present invention, both of the relay station 4 and the terminal 5 come with a plural quantity and the third signal 40 is one selected from the group consisting of a 3G signal, a 4G signal, a WiFi signal, a Zigbee signal, a Bluetooth signal, a RFID signal, a powerline signal, an EnOcean signal and a Zwave signal.

Figure 3:
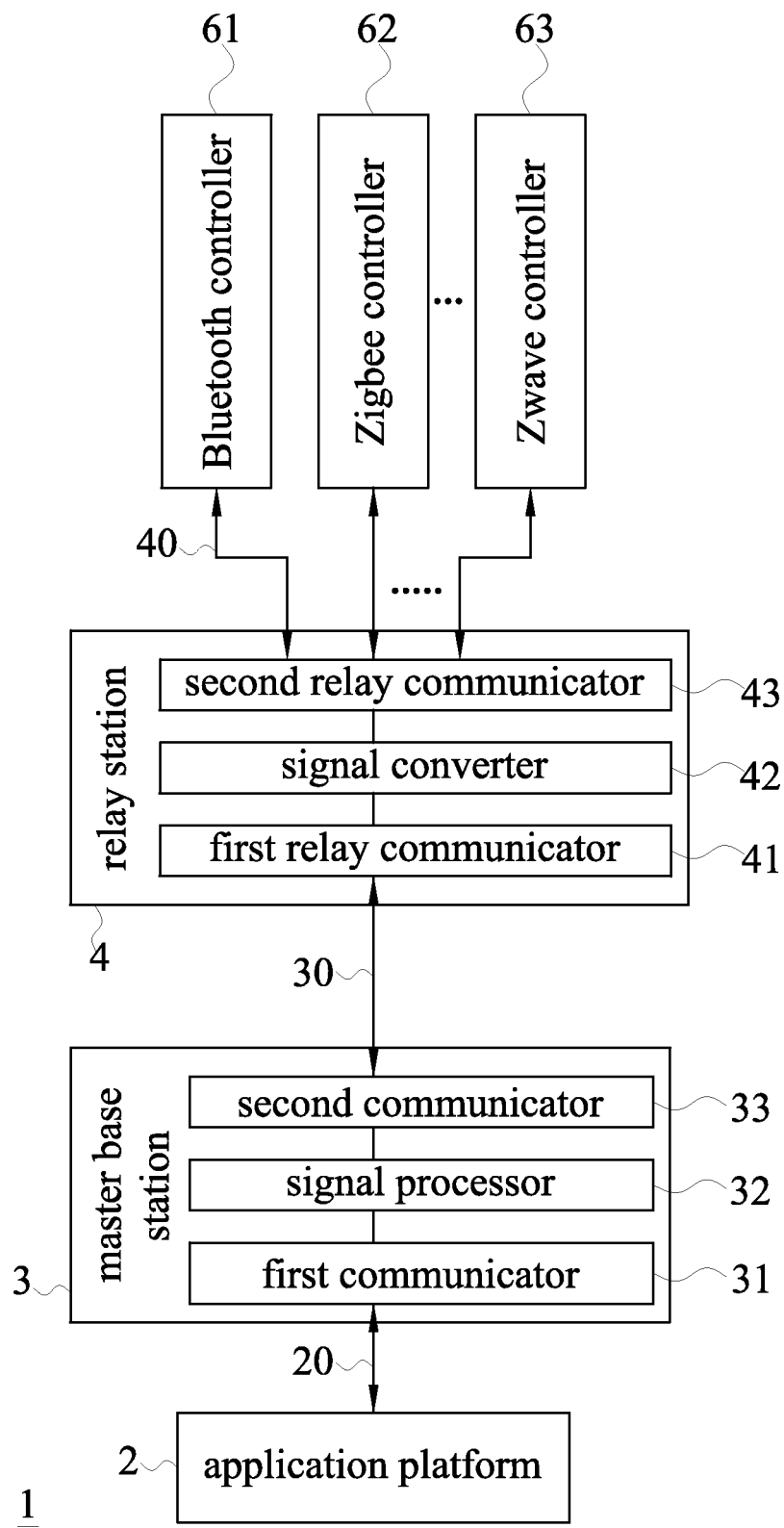
FIG. 3 is a schematic block diagram of the first preferred embodiment of the present invention, when a terminal is a controller.

With reference to FIG. 3 for a schematic block diagram of the first preferred embodiment of the present invention when the terminal is a controller, the terminal 5 comes with a plural quantity, and these terminals include a Bluetooth controller 61, a Zigbee controller 62 and a Zwave controller 63, and the third signal 40 is corresponsive to the type of signal transmitted or received by a controller of a different communication protocol, wherein the third signal 40 is a Zigbee signal, a Bluetooth signal, or a Zwave signal. If the terminal is a powerline controller or an EnOcean controller, then the third signal will be a powerline signal or an EnOcean signal, and this mode may be applied as a communication mode of a heterogeneous network such as an application of household power supply control, audio/video entertainment control, safety surveillance and control, or health management control.

In addition, the terminals 5 include a wireless identification code corresponsive to the relay station 4, and the wireless identification code is assigned through the relay station 4 to generate an encrypted authentication code, and the encrypted authentication code prevents the system from being intruded, monitored or controlled by others maliciously, so that the heterogeneous network control system 1 provides a better security.

Figure 4:
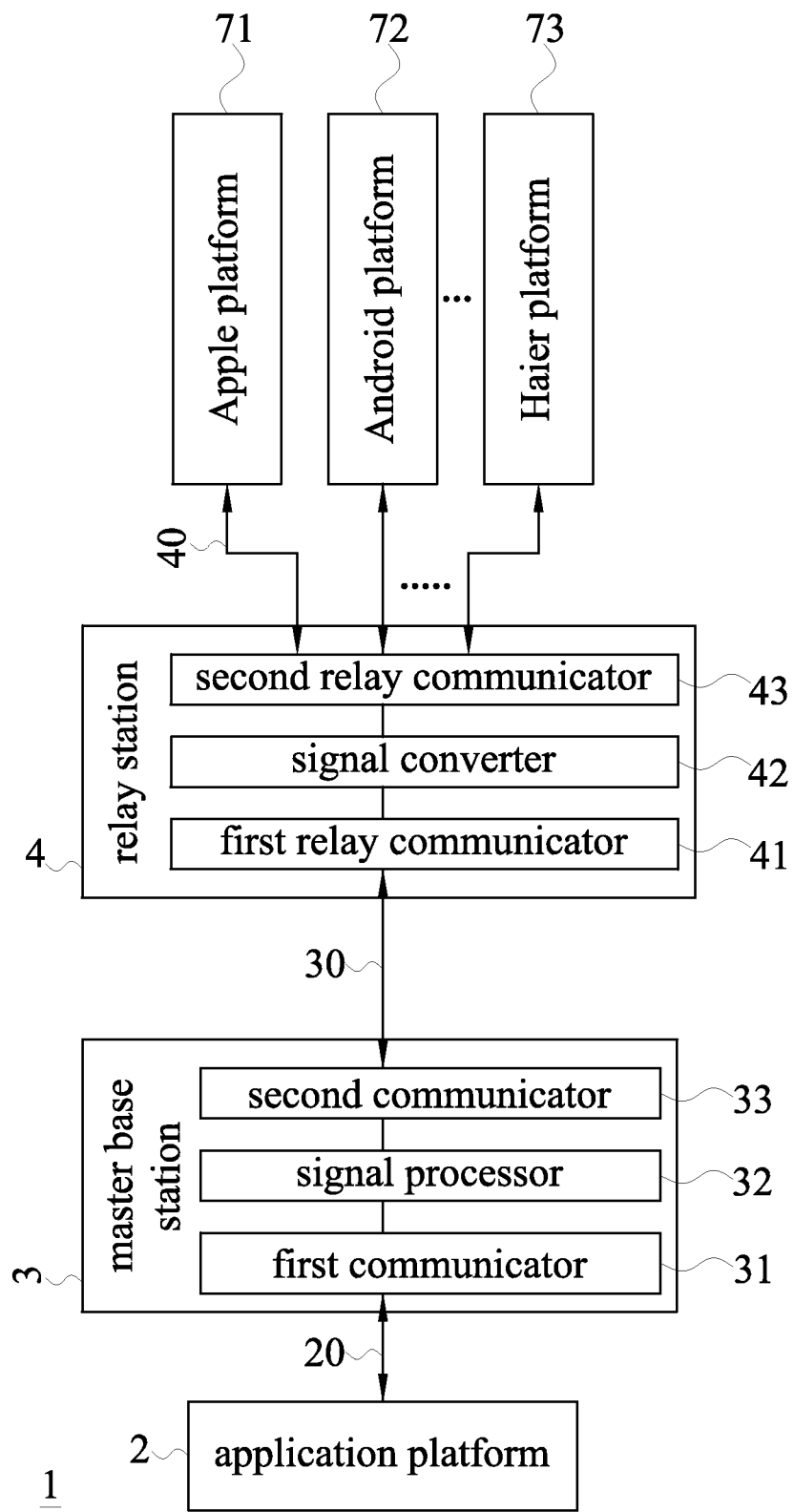
FIG. 4 is a schematic block diagram of the first preferred embodiment of the present invention, when a terminal is a terminal is a mobile device.

With reference to FIG. 4 for a schematic block diagram of the first preferred embodiment of the present invention when the terminal is a mobile device, when the terminal 5 comes with a plural quantity, and the terminals 5 are mobile devices of Apple platform 71, Android platform 72 and Haier platform 73, so that the third signal 40 is one selected from the group consisting of a 3G signal, a 4G signal, a WiFi signal and a Bluetooth signal, and the relay station 4 can communication with different platforms, and this mode may be applied in the area of mall management or logistics management for controlling the conditions of goods or products as well as assisting consumers to search for their desired shopping items quickly.

Figure 5:
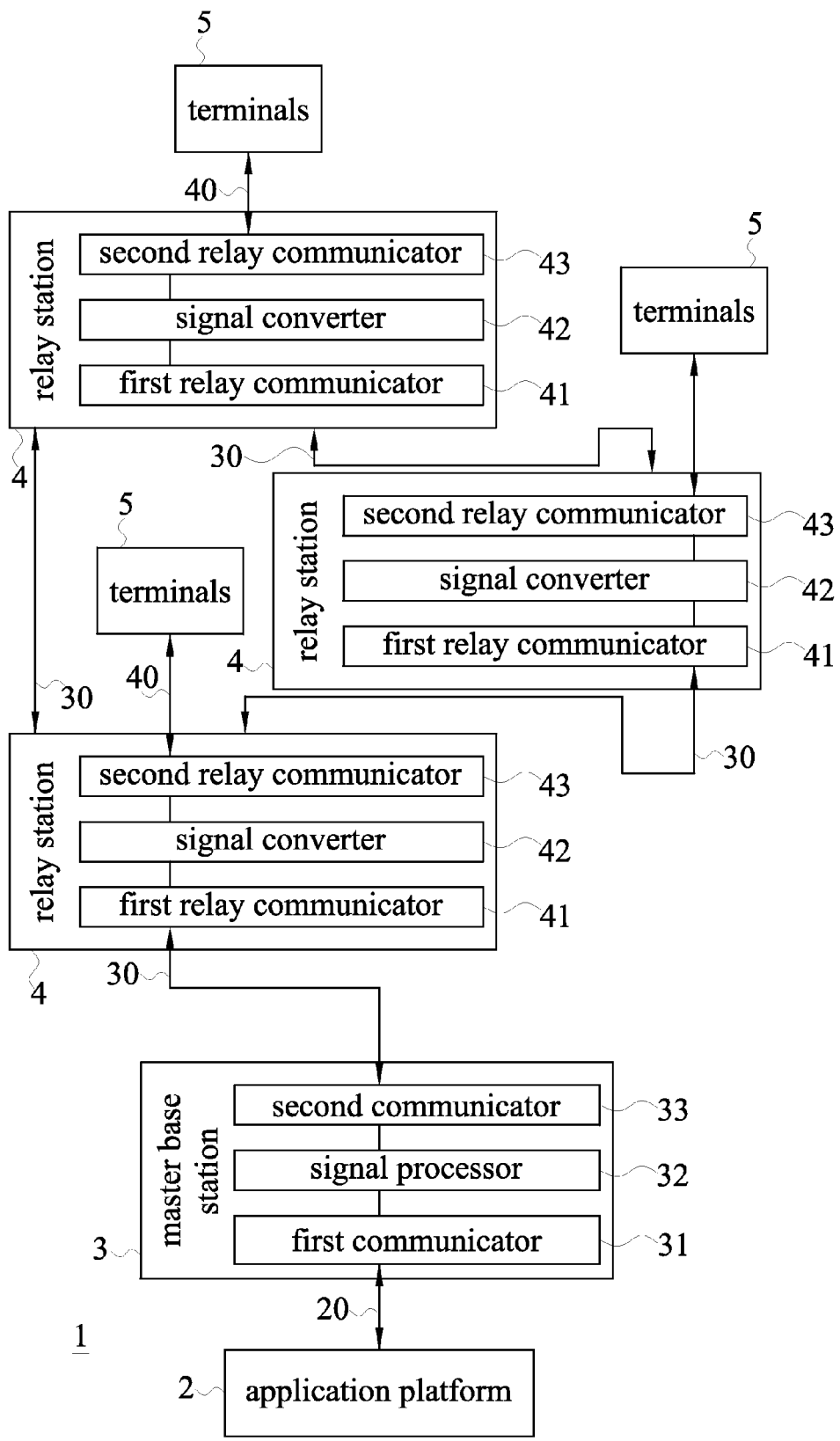
FIG. 5 is a schematic block diagram of a second preferred embodiment of the present invention.

With reference to FIG. 5 for a schematic block diagram of a second preferred embodiment of the present invention, when the relay station 4 comes with a plural quantity, the relay stations 4 are telecommunicatively connected with each other through the second signal 30, and this mode allows the relay stations 4 to act as media for transmitting signals with each other. Regardless of the distance between the application platform 2 and the terminals 5, the application platform 2 and the terminal 5 can communication with each other bi-directionally.

In the heterogeneous network control system of the present invention, the signal processor 32 of the master base station 3 and the signal converter 42 of the relay station 4 can convert the first signal 20, the second signal 30, and the third signal 40 bi-directionally, and the application platform can transmit and receive signals regardless of a 3G, 4G, WiFi or Bluetooth signal of different communication protocols through the relay station 4 even if the terminal is a Bluetooth controller, a Zigbee controller, a powerline controller, an EnOcean controller or a Zwave controller. This mode provides a communication mode for a heterogeneous network in the applications of household power supply control, audio/video entertainment control, safety surveillance and control, health management control, etc. In addition, the encrypted authentication code can prevent the system from being intruded, monitored or controlled by others maliciously, so that the heterogeneous network control system 1 provides a better security. When the terminal 5 comes with a plural quantity, the terminals 5 are a mobile device with Apple platform 71, a mobile device with Android platform 72 and a mobile device with Haier platform 73, etc, and the relay station 4 can transmit and receive packets of different operating platforms. This mode is applicable to mall management or logistics management for controlling the conditions of goods or products as well as assisting consumers to search for their desired shopping items quickly. The heterogeneous network control system of the present invention provides a communication method for different network protocols or different operating platforms, and achieves the effects of integrating heterogeneous protocols and heterogeneous operating platforms, so as to simplify the system.

What is claimed is:

1. A heterogeneous network control system, comprising a master base station and at least one relay station, and the master base station comprising a first communicator, a second communicator and a signal processor, and the relay station comprising a first relay communicator, a second relay communicator and a signal converter, and the first communicator being bi-directionally and telecommunicatively connected to an application platform through a first signal, and the first communicator being telecommunicatively connected to the signal processor, and the signal processor being telecommunicatively connected to the second communicator, and the second communicator being bi-directionally and telecommunicatively connected to the first relay communicator through a second signal, and the first relay communicator being telecommunicatively connected to the signal converter, and the signal converter being telecommunicatively connected to the second relay communicator, and the second relay communicator being bi-directionally and telecommunicatively connected to at least one terminal through a third signal, characterized in that when the heterogeneous network control system transmits signals from the application platform to the terminal via a signal transmission path, the first signal is converted into the second signal by the signal processor, and the second signal is converted into the third signal by the signal converter, and when the heterogeneous network control system transmits signals from the terminal to the application platform via the signal transmission path, the third signal is converted into the second signal by the signal converter, and the second signal is converted into the first signal by the signal processor to achieve a communication mode of a heterogeneous network, and the first signal is one selected from the group consisting of a 3G signal, a 4G signal, a WiFi signal, a powerline signal and a Bluetooth signal, and the second signal is one selected from the group consisting of a WiFi signal, a Bluetooth signal, a Zigbee signal, a powerline signal, an EnOcean signal and a Zwave signal.

2. The heterogeneous network control system of claim 1, wherein the third signal is one selected from the group consisting of a 3G signal, a 4G signal, a WiFi signal, a Zigbee signal, a Bluetooth signal, a RFID signal, a powerline signal, an EnOcean signal and a Zwave signal.

3. The heterogeneous network control system of claim 1, wherein when the terminal is a controller, the third signal is one selected from the group consisting of a WiFi signal, a Zigbee signal, a Bluetooth signal, a RFID signal, a powerline signal, an EnOcean signal and a Zwave signal.

4. The heterogeneous network control system of claim 3, wherein the controller includes a wireless identification code corresponsive to the relay station, and the wireless identification code is assigned through the relay station to generate an encrypted authentication code.

5. The heterogeneous network control system of claim 1, wherein when the terminal is a mobile device, the third signal is one selected from the group consisting of a 3G signal, a 4G signal, a WiFi signal and a Bluetooth signal.

6. The heterogeneous network control system of claim 1, wherein when the relay station comes with a plural quantity, the relay stations are connected with each other through the second signal telecommunication.

\* \* \* \* \*